(12) United States Patent
Ohmi et al.

(10) Patent No.: US 6,273,477 B1
(45) Date of Patent: *Aug. 14, 2001

(54) GASKET AND PIPE JOINT

(75) Inventors: Tadahiro Ohmi, 2-1-17-301, Komegafukuro, Aoba-ku, Sendai-shi, Miyagi; Michio Yamaji, Osaka; Tsutomu Shinohara, Osaka; Nobukazu Ikeda, Osaka; Akihiro Morimoto, Osaka, all of (JP)

(73) Assignee: Tadahiro Ohmi, Miyagi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,942

(22) Filed: Feb. 22, 1999

(30) Foreign Application Priority Data

Feb. 23, 1998 (JP) .................................................. 10-040038

(51) Int. Cl.$^7$ ...................................................... F16L 25/00
(52) U.S. Cl. ........................... 285/328; 285/917; 277/541
(58) Field of Search .................................. 285/328, 917, 285/272, 379

(56) References Cited

U.S. PATENT DOCUMENTS

| 4,660,868 | * | 4/1987 | Totani | 285/328 |
| 5,118,141 | * | 6/1992 | Miyashita | 285/917 |
| 5,458,156 | * | 10/1995 | Okubo et al. | 138/145 |
| 5,575,245 | * | 11/1996 | Watanabe | 123/41.7 |
| 5,678,803 | * | 10/1997 | Shinohara | 251/368 |

FOREIGN PATENT DOCUMENTS 0 758 067    2/1997   (EP) .

OTHER PUBLICATIONS

Patent Abstract of Japan, Publication No. 07278758, Oct. 24, 1995.
Patent Abstract of Japan, Publication No. 09279315, Oct. 28, 1997.

* cited by examiner

Primary Examiner—Lynne H. Browne
Assistant Examiner—Aaron M Dunwoody
(74) Attorney, Agent, or Firm—Armstrong, Westerman, Hattori, McLeland & Naughton, LLP

(57) ABSTRACT

A pipe joint comprises a pair of tubular joint members, an annular gasket interposed between opposed end faces of the two joint members, and threaded means for joining the two joint members. Each of the joint members is prepared from a stainless steel having a surface with a Vickers hardness of at least 300. The gasket is prepared from a stainless steel comprising, in ratio by weight, 12.90 to 15.00% of Ni, 16.50 to 18.00% of Cr, 2.00 to 3.00% of Mo, up to 0.02% of C, up 0.30% of Si, up to 0.40% of Mn, up to 0.03% of P, up to 0.003% of S, up to 0.25% of Cu and up to 0.01% of Al, the gasket having a surface with a Vickers hardness of 90 to 160.

3 Claims, 2 Drawing Sheets

GASKET AND PIPE JOINT

BACKGROUND OF THE INVENTION

The present invention relates to a gasket and a pipe joint comprising the gasket.

Pipe joints are widely used, for example, in fluid control devices for use in fabricating semiconductors. Such pipe joints comprise a pair of tubular joint members, an annular gasket interposed between opposed end faces of the two joint members, and threaded means for joining the two joint members. With pipe joints of the type described, it is common practice to prepare the tubular joint members and the gasket from the same stainless steel (e.g., SUS316L). When checked for Vickers hardness, the joint members had a hardness of about 310 to about 390 Hv at the surface and about 260 to about 320 Hv at a portion thereof 100 micrometers away from the surface, and the gasket had a hardness of about 300 to about 330 Hv at the surface and about 260 to about 290 Hv in its interior.

Since pipe joints are repeatedly disassembled and reassembled for the maintenance and inspection of the fluid control device, the conventional pipe joint wherein the tubular joint members and gasket are made of the same stainless steel has the problem that the joint members which are difficult to replace unlike the gasket develop flaws, failing to assure the joint of fluid tightness. Although it is possible to change the material for the gasket from stainless steel to nickel or copper which is softer, another problem is then encountered in that the material reacts with the gas for use in fabricating semiconductors. For example, Ni reacts with CO at room temperature, producing Ni carbonyl [Ni$(CO)_4$] gas, resulting in impaired fluid tightness due to the corrosion of Ni or reducing the purity of the gas to be used for manufacturing semiconductors.

SUMMARY OF THE INVENTION

An object of the present invention is to provide a gasket which Is unlikely to react with a gas such as CO, also obviating the likelihood that the tubular joint member, which is difficult to replace unlike the gasket, will be flawed, and a pipe joint comprising the gasket.

The present invention provides a gasket prepared from a stainless steel comprising, in ratio by weight, 12.90 to 15.00% of Ni, 16.50 to 18.00% of Cr, 2.00 to 3.00% of Mo, up to 0.02% of C, up to 0.30% of Si, up to 0.40% of Mn, up to 0.03% of P, up to 0.003% of S, up to 0.25% of Cu and up to 0.01% of Al, the gasket having a surface with a Vickers hardness of 90 to 160.

The preset invention provides a pipe joint comprising a pair of tubular joint members, an annular gasket interposed between opposed end faces of the two joint members, and threaded means for joining the two joint members, the pipe joint being characterized in that each of the joint members is prepared from a stainless steel having a surface with a Vickers hardness of at least 300, the gasket being prepared from a stainless steel comprising, in ratio by weight, 12.90 to 15.00% of Ni, 16.50 to 18.00% of Cr, 2.00 to 3.00% of Mo, up to 0.02% of C, up to 0.30% of Si, up to 0.40% of Mn, up to 0.03% of P, up to 0.003% of S, up to 0.25% of Cu and up to 0.01% of Al, the gasket having a surface with a Vickers hardness of 90 to 160.

When the Vickers hardness of the surface of the gasket is smaller than 90, the gasket fails to have a sufficient strength, whereas if the hardness exceeds 160, there is an increased likelihood that the gasket will mar or flaw the joint member made from a stainless steel having a surface with a Vickers hardness of at least 300 (usually up to 400). The gasket surface is more preferably 100 to 140 Hv in Vickers hardness.

According to the present invention, each tubular joint member, which is difficult to replace unlike the gasket, is precluded from being marred or flawed, and the gasket and the tubular joint member will not react with CO or like gas since both are made from stainless steel, consequently eliminating another problem of entailing impaired fluid tightness or lowering the purity of the gas for use in fabricating semiconductors.

DESCRIPTION OF THE PREFERRED EMBODIMENTS

Embodiments of the invention will be described below with reference to the drawings. The terms left and right as used in the following description refer respectively to the left-hand side and the right-hand side of the drawings.

Figure 1:
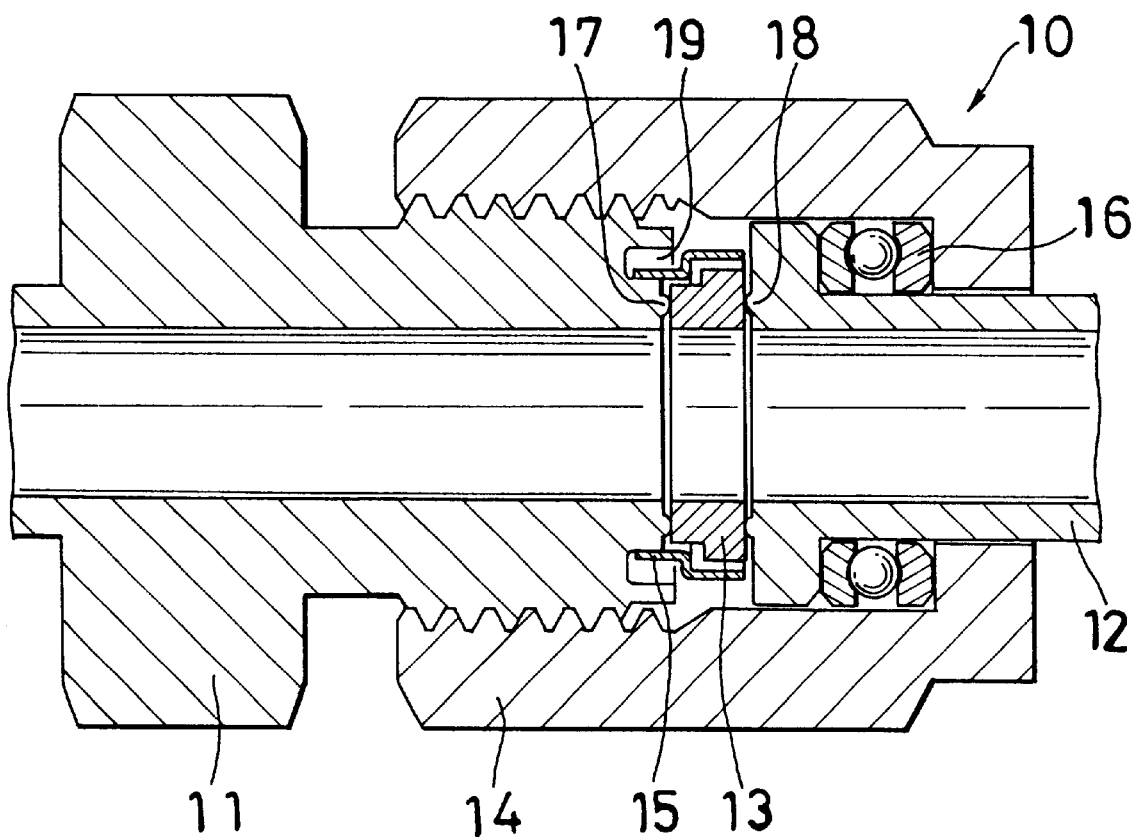
FIG. 1 is a view in longitudinal section showing a gasket and a pipe joint as a first embodiment of the invention.
Figure 2:
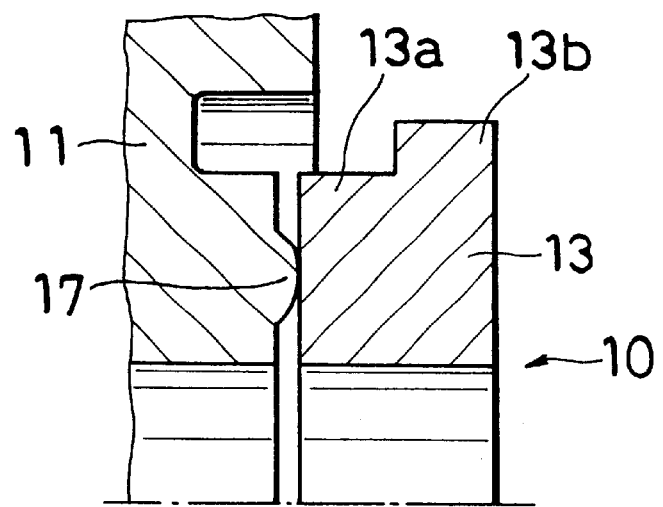
FIG. 2 is a fragmentary view in longitudinal section of the same.

FIGS. 1 and 2 show a gasket and a pipe joint as a first embodiment of the invention. With reference to FIG. 1, the pipe joint 10 comprises a first tubular joint member 11, a second tubular joint member 12, an annular gasket 13 interposed between the right end face of the first joint member 11 and the left end face of the second joint member 12, a nut 14 provided on the second joint member 12 and screwed on the first joint member 11, a retainer 15 holding the gasket 13 thereon and held to the first joint member 11, and a thrust ring 16 provided between a top wall of the nut 14 and a flange of the second joint member 12.

Gasket holding annular ridges 17, 18 are formed on the opposed end faces of the respective joint members 11, 12. The first joint member 11 is further formed with an annular recessed portion 19 positioned radially outwardly of the annular ridge 17 for accommodating the retainer therein. The retainer 15 is in engagement with the inner periphery of the recessed portion 19.

The gasket 13 has an inside diameter equal to the diameter of flow channels of the joint members 11, 12, and comprises a small-diameter portion 13*a* and a large-diameter portion 13*b* having a larger diameter than the portion 13*a*.

With the pipe joint 10, the gasket 13 is held by the retainer 15, which is held to the first joint member 11, and the large-diameter portion 13*b* of the gasket 13 is in bearing contact with the second joint member 12, whereby the gasket 13 is reliably positioned in place to preclude impairment of fluid tightness due to displacement. When the pipe joint 10 is to be assembled again after disassembly, the gasket 13 is replaced by a new one if required, and the components other than the gasket 13 are installed for continued use.

With the pipe joint 10 described, the retainer 15, the joint members 11, 12 and the gasket 13 are all made from stainless steel. The retainer 15 is prepared from SUS304, and the joint members 11, 12 are prepared from SUS316L. The gasket 13 is prepared from a stainless steel comprising, In ratio by weight, 12.90 to 15.00% of Ni, 16.50 to 18.00% of Cr, 2.00 to 3.00% of Mo, up to 0.02% of C, up to 0.30% of Si, up to 0.40% of Mn, up to 0.03% of P, up to 0.003% of S, up to 0.25% of Cu and up to 0.01% of Al. The N content of the stainless steel for the gasket Is limited to not higher than 150 ppm, the O content thereof to not higher than 20 ppm, and the H content thereof to not higher than 5.0 ppm.

The gasket 13 is prepared by hot-working the stainless steel of the above composition at a forging ratio corresponding to at least 3S as an overall value, followed by a solid solution heat treatment (temperature 1010 to 1150° C., water-cooling), whereby the gasket is given a Vickers hardness of 90 to 160 Hv and the mechanical properties of at least 175 N/mm$^2$ in 0.2% proof stress, at least 480 N/mm$^2$ in tensile strength, at least 40% in elongation and at least 60% in reduction of area.

Among the components of the stainless steel for the gasket, Ni, Cr and Mo other than the iron base mainly exhibit an effect to give enhanced corrosion resistance in an oxidizing environment or reducing environment. If the proportions of Ni, Cr and Mo are outside the respective ranges of 12.90 to 15.00%, 16.50 to 18.00% and 2.00 to 3.00%, it is difficult to obtain the corrosion resistance and high cleanliness. The C content is limited to not higher than 0.02% because of the need to inhibit the precipitation of carbides due to welding or heat treatment. Although Si is useful for giving enhanced corrosion resistance and increased elasticity, the Si content is restricted to not higher than 0.30% to prevent a reduction in toughness and diminish metallic inclusions. Similarly, the Cu content is restricted to not higher than 0.25% from the viewpoint of precluding impairment of hot workability and diminishing nonmetallic inclusions. The Al content is limited to not higher than 0.01% in order to prevent surface deterioration and diminish metallic inclusions. Furthermore, the Mn content is limited to not greater than 0.40% to prevent decrease of corrosion resistance in the vicinity of welds, and P and S contents are limited to not higher than 0.03% and not higher than 0.003%, respectively, to diminish harmful substances and nonmetallic inclusions.

The stainless steel for the gasket is further restricted to up to 0.05% in cleanliness as prescribed in JIS G 0555. The stainless steel is subjected to a double melting treatment in a vacuum to reduce the contents of impurities to the greatest possible extent and to obtain a stabilized steel ingot free from segregation, whereby the cleanliness is attained. This serves to diminish flaws attributable to the presence of impurities (nonmetallic inclusions) in the material, precluding impairment of fluid tightness.

When checked for Vickers hardness, the first joint member 11 was 382 Hv at the surface of the ridge 17, 312 Hv at a portion thereof 100 micrometers axially away from the surface of the ridge 17 and 280 Hv at a portion thereof similarly at a distance of 300 micrometers from the same. On the other hand, the gasket 13 was 110 Hv at the surface and 105 Hv in its interior.

Figure 3:
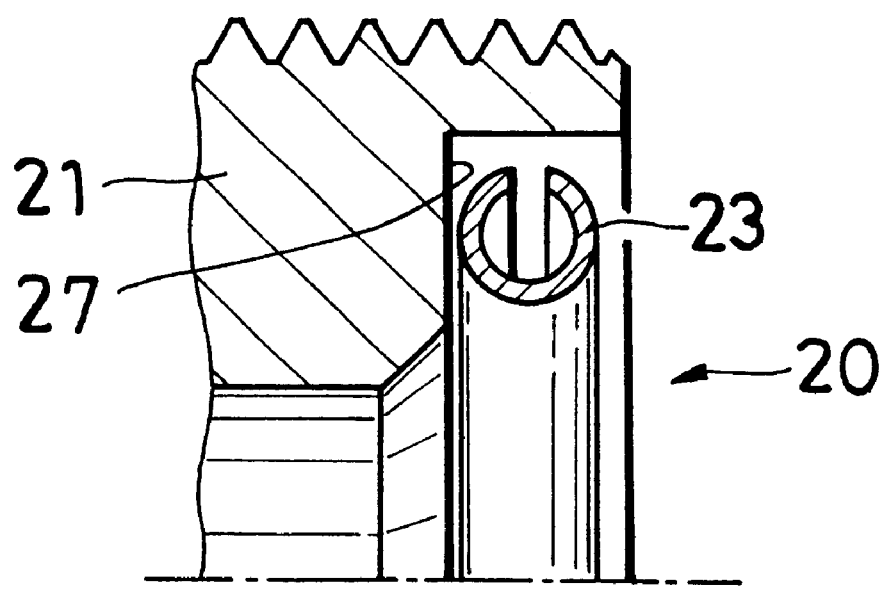
FIG. 3 is a fragmentary view in longitudinal section of a gasket and a pipe joint as a second embodiment of the invention.

FIG. 3 shows a gasket 23 and a pipe joint 20 as a second embodiment of the invention. As shown in the drawing, the pipe joint 20 comprises a first tubular joint member 21 having an annular recessed portion 27 of square to rectangular cross section for the gasket 23 to fit in, and the gasket 23 which is annular, C-shaped in cross section and interposed between the right end face of the first joint member 21 and the left end face of a second tubular joint member (not shown).

The joint member 21 is made from SUS316L, while the gasket 23 is prepared from the same stainless steel as the gasket of the first embodiment described.

Figure 4:
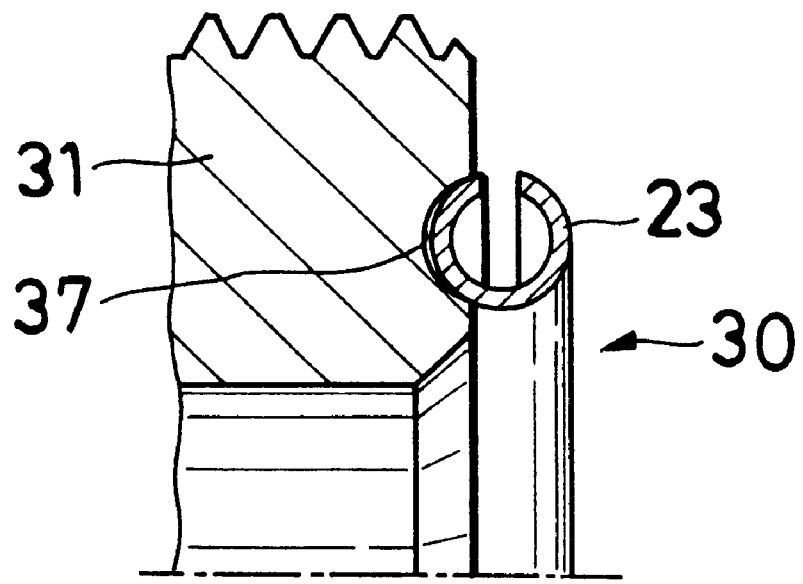
FIG. 4 is a fragmentary view in longitudinal section of a gasket and a pipe joint as a third embodiment of the invention.

FIG. 4 shows a gasket 23 and a pipe joint 30 as a third embodiment of the invention. The gasket 23 of this pipe joint 30 is the same as the gasket 23 of the second embodiment described in shape and material. This pipe joint 30 differs from the pipe joint 20 of the second embodiment in that a gasket fitting recessed portion 37 of a first tubular joint member 31 is generally semicircular in cross section in corresponding relation with the annular gasket 23 of C-shaped cross section.

The pipe joints 10, 20, 30 according to the first to third embodiments described and conventional pipe joints were disassembled and reassembled repeatedly for testing, and the flaws developed in the first joint members were observed as enlarged to 500 times. Table 1 shows the results. With reference to Table 1. "Inv. 1" (i.e., Invention 1) refers to the joint of the first embodiment, "Inv. 2" to that of the second embodiment, "Inv. 3" to that of the third embodiment, and "Comp. Ex. 1" and "Comp. Ex. 2" to conventional joints corresponding to the second embodiment. The gasket of Comp. Ex. 1 was made from SUS316L, and the gasket of Comp. Ex. 2 from nickel. The hardness is Vickers hardness as measured by a device, MicroVickers, under a load of 300 g for 30 seconds. The surface hardness of the joint member 11 (21, 31) was measured at the surface thereof to be in contact with the gasket 13 (23), and the internal hardness thereof is a measurement obtained as a representative value at a portion thereof 100 micrometers axially away from the surface thereof to be in contact with the gasket 13 (23).

TABLE 1

|  | Inv. 1 | Inv. 2 | Inv. 3 | Comp. Ex. 1 | Comp. Ex. 2 |
|---|---|---|---|---|---|
| Joint member surface hardness | 382 | 316 | 314 | 316 | 316 |
| Joint member internal hardness | 312 | 320 | 259 | 320 | 320 |
| Gasket surface hardness | 110 | 125 | 120 | 322 | 178 |
| Gasket internal hardness | 105 | 112 | 110 | 282 | 198 |
| After disassembly and reassembly once | No flaw | No flaw | No flaw | Flawed | Flawed |
| After disassembly and reassembly ten times | No flaw | No flaw | No flaw | Many flaws | Flawed |

The test results given in Table 1 reveal the following. The joint member of Comp. Ex. 1 developed marked flaws, and the joint member of Comp. Ex. 2 wherein the gasket was made from nickel also developed flaws, whereas In the case of the first to third embodiments, the joint members 11, 21, 31 remained flawless even after the repetition of disassembly and reassembly ten times. Thus, with the gaskets 13, 23 and the pipe joints 10, 20, 30 embodying the present invention, the tubular joint members 11, 21, 31, which are difficult to replace unlike the gaskets 13, 23, are precluded from being marred or flawed. Moreover, the gaskets 13, 23 and the tubular joint members 11, 21, 31 will not react with CO or like gas since they are all made from stainless steel, consequently eliminating another problem of entailing impaired fluid tightness or lowering the purity of the gas for use in fabricating semiconductors.

What is claimed is:

1. A pipe joint comprising a pair of tubular joint members, an annular gasket interposed between opposed end faces of the two joint members, and threaded means for joining the two joint members, the pipe joint being characterized in that each of the joint members is prepared from a stainless steel having a surface with a Vickers hardness of at least 300, the gasket being prepared from a stainless steel comprising, in radio by weight, 12.90 to 15.00% of Ni, 16.50 to 18.00% of Cr, 2.00 to 3.00% of Mo, up to 0.02% of C, up to 0.30% of Si, up to 0.40% of Mn, up to 0.03% of P, up to 0.003% of S, up to 0.25% of Cu and up to 0.01% of Al, the gasket having a surface with a Vickers hardness of 90 to 160, such that flaws are prevented from developing in the opposed end faces of said two joint members upon repeated disassembly and reassembly of the two joint members when said gasket is interposed between the opposed end faces.

2. A pipe joint according to claim 1 wherein the gasket has a surface with a Vickers hardness of 100 to 140.

3. A pipe joint according to claim 1 wherein the gasket and the tubular joint members will not react with CO.

* * * * *